United States Patent [19]

Weinberg et al.

[11] 4,239,799

[45] Dec. 16, 1980

[54] BLENDS OF BUTYL RUBBER AND POLYMERS OF VINYLIDENE CHLORIDE

[75] Inventors: Alan S. Weinberg, Greenville, S.C.; Mario Gillio-Tos, Rho, Italy

[73] Assignee: W. R. Grace & Co., Duncan, S.C.

[21] Appl. No.: 858,938

[22] Filed: Dec. 9, 1977

Related U.S. Application Data

[63] Continuation of Ser. No. 740,448, Oct. 27, 1976, abandoned.

[51] Int. Cl.$^3$ .................. B32B 27/08; C08L 91/00
[52] U.S. Cl. ........................................ 428/335; 260/3; 260/23.7 M; 260/28.5 B; 260/29.7 B; 426/127; 426/415; 428/336; 428/518; 428/519; 428/520
[58] Field of Search .............. 260/29.7 B, 3, 28.5 B, 260/23.7 M, 42, 42.27, 42.43, 42.46, 42.47, 42.48, 42.51, 887, 890, 888, 896; 428/215, 335, 336, 519, 518, 520, 529, 495, 220; 426/106, 127, 129, 130, 415

[56] References Cited

U.S. PATENT DOCUMENTS

| | | | |
|---|---|---|---|
| 2,511,113 | 5/1947 | LaPiana | 260/29.4 UA |
| 3,015,640 | 1/1962 | Weaver | 260/888 |
| 3,158,664 | 11/1964 | Baer | 260/888 |
| 3,166,526 | 1/1965 | Butzler et al. | 260/890 |
| 3,255,144 | 6/1966 | Fefer et al. | 260/29.7 B |
| 3,597,372 | 8/1971 | Cook | 260/28 X |
| 3,645,838 | 2/1972 | Newman et al. | 428/520 X |
| 3,658,947 | 4/1972 | Ito et al. | 260/887 |
| 3,713,965 | 1/1973 | Widiger et al. | 428/518 X |
| 3,741,253 | 6/1973 | Brax et al. | 428/520 X |
| 3,879,492 | 4/1975 | Bontinick | 260/888 X |

FOREIGN PATENT DOCUMENTS 987823 3/1965 United Kingdom .

*Primary Examiner*—Thomas J. Herbert, Jr.
*Attorney, Agent, or Firm*—John J. Toney; William D. Lee, Jr.

[57] ABSTRACT

Saran blended with butyl rubber exhibits a good balance of melt extrudability and oxygen barrier properties.

12 Claims, No Drawings

BLENDS OF BUTYL RUBBER AND POLYMERS OF VINYLIDENE CHLORIDE

This is a continuation of application Ser. No. 740,448, filed on Oct. 27, 1976, now abandoned.

The present invention relates to a thermoplastic blend of butyl rubber and saran, a film formed of the blend and a multi-ply structure including a core layer of the blend.

As used herein the term "butyl rubber" includes copolymers made from the polymerization of a reaction mixture comprising isobutylene and a diolefin having 4 or 5 carbon atoms per molecule, e.g., isoprene. Although these polymers may contain about 0.2 to about 15% combined diolefin, the preferred butyl rubber polymers contain about 0.6 to about 4.5 weight percent, more preferably about 1.0 to about 1.8 weight percent, diolefin, the remainder of the polymer being comprised of the isoolefin component. Typically, butyl rubber includes copolymers of isobutylene and isoprene including from 90 to 99.5 percent by weight isobutylene units and from 10 to 0.5 percent by weight isoprene units. Butyl rubber may be prepared by the processes set out in U.S. Pat. Nos. 3,856,763 and 3,850,894.

As used herein the term "saran" means a vinylidene chloride polymer including vinylidene chloride units in an amount from about 51 to about 95 parts by weight and other monomers copolymerizable therewith, e.g. vinyl chloride, in an amount from about 49 to about 5 parts by weight per 100 parts by weight of the polymer. Minor amounts, e.g. 0.5 to 5 or more parts by weight, of one or more additional ethylenically unsaturated compounds may be interpolymerized with the vinylidene chloride and the vinyl chloride, resulting in sarans which are terpolymers, tetrapolymers, etc. Suitable additional compounds include, for example, vinyl acetate, methyl acrylate, methyl acrylate, methyl methacrylate, ethyl methacrylate, and acrylonitrile.

British Pat. No. 987,823 discloses blends and packaging films of polymers of vinylidene chloride, which may include vinyl chloride as comonomer, and an elastomeric material which is either natural rubber or a synthetic polymer of certain specified ethylenically unsaturated compounds enumerated at column 2, page 2, lines 106-116 as modified at pp. 3-4 but not including the butyl rubber defined herein.

U.S. Pat. No. 2,511,113 (LaPlana et al.) discloses coating fibers with a pigment binder composition essentially comprising a chlorine-containing resin prepared by polymerizing compounds containing the vinyl group $CH_2=CHX$ or the vinylidene group $CH_2=CX_2$, preferably in combination with a plasticizer, such as synthetic rubber latex, and a water soluble, thermosetting urea formaldehyde containing resin. Synthetic rubber latexes disclosed therein are copolymers of butadiene and styrene, copolymers of acrylonitrile with butadiene, and copolymers of isoprene with isobutylene. The LaPlana patent discloses that the blends of vinyl resins and synthetic rubbers have thermosetting properties.

U.S. Pat. No. 3,741,253 (Brax et al.) disclosed laminates of ethylene-vinyl acetate polymers and polymers of vinylidene chloride, e.g. saran. As described therein the saran may include epoxy resin and 2-ethyl hexyl diphenyl phosphate. The laminate may also be prepared as described therein by a method including melt extruding an ethylene-vinyl acetate interpolymer ply and, following irradiation thereof, coating an extruded saran film thereon to form a two ply tubular film and thereafter coating the saran with another polymer which may be an ethylene vinyl acetate interpolymer.

U.S. Pat. No. 3,713,965 (Whitaker) discloses a composite laminated film with molecular orientation prepared by coextruding plasticized saran and ethylene-vinyl acetate copolymer.

U.S. Pat. No. 3,645,838 (Newman et al.) discloses a composite laminated sheet including layers of polymer-plasticized saran and ethylene-vinyl acetate copolymer.

U.S. Pat. No. 3,255,144 (Fefer et al.) relates to coating compositions of butyl rubber and certain copolymers of ethylene-vinyl acetate copolymer.

Patents of possible further interest include U.S. Pat. Nos. 3,597,372; 3,658,947; and 3,658,752.

Heretofore, saran polymers having low oxygen permeability properties suitable for fresh red meat and other packaging applications have typically been extruded and otherwise worked only with great difficulty even when blended with stabilizers and plasticizers. However, attempts to increase such packaging performance properties for low temperature applications, such as flex cracking resistance and abuse resistance, by increasing the amount of plasticizers heretofore used in saran have resulted in loss of oxygen barrier properties.

It has now been found by the practice of the present invention that butyl rubber can be mixed with saran and that the resulting mixtures are typically characterized with an improved balance of oxygen permeation resistance, thermal stability plasticization or extrudability, and abuse resistance of films formed thereof.

Generally stated, in one aspect of this invention there is provided a composition comprising a mixture of saran and butyl rubber. Typically, the saran-butyl rubber composition is thermoplastic and capable of being melt extruded.

In another aspect, the present invention provides a film formed of the saran-butyl rubber composition. The film may be substantially unoriented, monoaxially oriented, or biaxially oriented. Typically, the film is a self-supporting flexible film.

In still another aspect, this invention provides an oriented or unoriented multi-ply film including a first ply of the saran-butyl rubber blend and a second ply of film or sheet material bonded to a surface of the first ply. The multi-ply film may include an additional ply or plies of film or sheet matrial bonded to either the surface of the first or second ply.

In another aspect, this invention provides improvements in known processes of preparing saran film without significantly affecting the oxygen permeability by extruding a saran/butyl rubber blend.

The present invention will be further understood by referring to the following detailed description.

The saran-butyl rubber composition of this invention can be prepared by mixing the saran component, the butyl rubber component and any compatible optional components to be included using liquid or solid components, as desired. Mixing may be effected using known mixing procedures and apparatus. For example, solid butyl rubber pellets and solid saran pellets can be blended in a Prodex Henchel high intensity mixer.

Preferably, butyl rubber latex (i.e., an aqueous dispersion) is added with saran supplied as resin pellets or powder preferably to the saran as a latex which is followed by stirring to form a substantially homogeneous mixture. The water is then removed, for example, by evaporation.

The butyl rubber component may be present in an amount from about 1 to about 10 parts, preferably from about 2 to about 5 parts, by weight per 100 parts by weight of the saran/butyl rubber blend.

The saran-butyl rubber compositions may, if desired, include functional quantities of such additives as antioxidants, thermal stabilizers, accelerators, dyes, inhibitors, activators, fillers, pigments, antistatic agents, flame retardant agents, thickeners, thixotropic agents, surface active agents, viscosity modifiers, extending oils, plasticizers, tackifiers and the like.

A preferred saran-butyl rubber composition may include butyl rubber in an amount from about 1 to about 10 parts by weight, a thermal stabilizer in an amount from about 1 to 5 parts by weight and a plasticizer in an amount from 0 up to about 4 parts by weight, and saran in an amount such that the total amount of the recited components is 100 parts by weight.

Blends of emulsion and suspension polymerized sarans may be used.

The present saran-butyl rubber compositions are typically thermoplastic and melt extrudable. Films having thickness from about 0.3 mil to about 10 mils or more may be formed from the compositions using known extrusion methods, for example, as described in Brax et al., U.S. Pat. No. 3,741,253.

Extruded films of the present invention having thickness from about 1 to about 2 mils typically have oxygen permeability from about 25 to about 60 cc. (24 hr/m$^2$/1 atmosphere) at 73° F.

Films of the present invention having thickness of from about 0.3 to 0.4 mil typically have oxygen permeability of from about 20 to about 70 cc. (24 hr/m$^2$/1 atmosphere) at 73° F.

Practice of the present invention will be further illustrated by the following non-limiting examples.

EXAMPLES 1-4

In the amounts indicated in Table I below, the following components were blended in a high speed, high intensity Prodex-Henschel blender with continuous mixing: emulsion polymerized saran resin, suspension polymerized saran resin, butyl rubber latex (63% butyl rubber solids), epichlorohydrin/bisphenol A epoxy resin, and 2-ethyl hexyl diphenyl phosphate. The epoxy resin and the phosphate plasticizer were liquids. The mixing sequence was as follows: the saran resins were initially added to the blender with continuous stirring. Thereafter, the liquid epoxy resin and the liquid phosphate were added with stirring; and thereafter the butyl rubber latex was added. Stirring or blending was continued under a vacuum of about 20-25 inches of mercury absolute. The mixture was heated to 160°-165° F. Substantially all of the water and other volatiles were found to be removed. Observation showed that the resulting mixture was a free-flowing, substantially dry granular mixture with good homogeneity.

For each example, a 50 gram sample of the free-flowing mass or mixture was added to a Brabender Plastograph with a roller head attachment. The Plastograph was operated at a constant speed of 63 RPM, a head temperature of 300° F., at a torque range of 0-10,000 m/gms. The thermal stability and relative and absolute torque at 16 min. working in the Brabender were determined. The results are also shown in Table I below. Additional amounts of the butyl rubber-saran mixtures prepared in Examples 1-3 were formed into 3 ply films using the procedure of example 1 of U.S. Pat. No. 3,741,253, incorporated herein by reference. The oxygen permeability of the three ply structure containing a saran layer having a thickness of 0.35-0.37 mil was determined using the ASTM D-1434 method B test. The results are also shown in the table, along with the range for the control obtained from analysis of numerous manufacturing runs.

| SARAN-BUTYL RUBBER COMPOSITIONS AND PROPERTIES APPROXIMATE AMOUNTS (PARTS BY WEIGHT) | | | | |
| --- | --- | --- | --- | --- |
| | Example 1 | Example 2 | Example 3 | Example 4 (Control) |
| COMPONENT | | | | |
| Saran* | 89 | 91 | 86 | 94 |
| Butyl Rubber Latex** | 5 | 5 | 10 | — |
| Bisphenol A/epichlorohydrin epoxy resin | 4 | 3 | 4 | 4 |
| 2-ethyl hexyl diphenyl phosphate | 2 | 1 | — | 2 |
| TESTS | | | | |
| Thermal Stability (Brabender minutes) | 30 | 22 | 18 | 18 |
| Brabender Torque at 16 Min. | | | | |
| Relative | 220 | 240 | 250 | 260 |
| Absolute (m/gm) | 2100 | 2200 | 2250 | 2500 |
| Oxygen Permeability - cc (24 hr/m$^2$/atm.) at 73° F. | 60 | 50 | 25 | 40-50 |
| Saran Film Ply Thickness - mils | 0.35 | 0.37 | 0.37 | 0.3-0.35 |

*BP-100 (Enjay Chemical Co.)
**Blend of emulsion and suspension polymerized sarans The thermal stability in Brabender minutes is measured by observing the plasticizing time at which the saran turns black. Higher times to blacken correspond to increased thermal stability which is generally proportional to increased extrudability or processability. Lower relative and absolute Brabender torque values correspond to higher melt flowability, lower melt viscosity, and improved plasticization of the saran. Lower oxygen permeability corresponds to improved oxygen barrier properties and better performance of the film for applications such as bags, pouches, and the like for vacuum packaging for fresh red meat.

The data show that the saran-butyl rubber compositions of this invention as illustrated by Examples 1-3 provide an excellent balance of low oxygen permeability and good melt extrudability making the compositions highly suitable for high speed extrusion film-forming operations to produce films having good oxygen barrier properties.

It is to be understood that the foregoing detailed description is given merely by way of illustration and that numerous modifications may be made therein without departing from the spirit or scope of the present invention.

What is claimed is:

1. A film of packaging material formed from a composition of matter consisting essentially of a mixture of
   (a) 85 to 99 parts by weight of a vinylidene chloride interpolymer having from about 51 to about 95 parts by weight vinylidene chloride, thermally plasticized by
   (b) 1 to 15 parts by weight of butyl rubber, based on 100 parts of composition weight said composition having a substantially unimpaired oxygen permeability as compared to the oxygen permeability of said interpolymer without said butyl rubber, and
   (c) an epoxy compound in an amount from about 1 to 5 parts by weight and 2-ethyl hexyldiphenyl phosphate in an amount up to about 10 parts by weight, said vinylidene chloride interpolymer being present in an amount such that the total amount of the recited components is 100 parts by weight.

2. The film of claim 1 wherein the vinylidene chloride interpolymer includes vinylidene chloride units in an amount from about 60 to about 80 parts by weight and vinyl chloride units in an amount from about 40 to about 20 parts by weight.

3. The film of claim 1 which has an absolute Brabender torque at 16 minutes at 300° F. of about 2,000 to about 2,500 m/gm, and a Brabender time to blackening at 300° F. of from about 18 to about 30 minutes and when formed into a film having a thickness of about 0.3 mil to about 0.4 mil is characterized by an oxygen permeability of from about 20 to about 70 cc. of oxygen at 73° F.

4. An oriented film made from the composition of claim 1.

5. The film of claim 1 wherein the thickness of the film is from about 1 to about 2 mils and the oxygen permeability is from about 25 to about 60 cc. at 73° F.

6. The film of claim 1 wherein the film has a thickness of from about 0.3 to 0.4 mil and the film has an oxygen permeability of from about 20 to about 70 cc. at 73° F.

7. The film of claim 1 wherein the butyl rubber is a butyl polymer comprising isobutylene in an amount from about 85 to about 99.8 parts by weight and a diolefin having 4 or 5 carbon atoms per molecule in an amount from about 15 to about 0.2 parts by weight per 100 parts by weight of said butyl polymer.

8. The film of claim 7 wherein the diolefin is isoprene.

9. The film of claim 7 wherein said butyl polymer comprises units of isobutylene in an amount from about 90 to about 99.5 parts by weight and units of isoprene in an amount from about 10 to about 0.5 parts by weight per 100 parts by weight of said butyl polymer.

10. A multiply film including a core layer and first and second layers on opposite sides of the core layer, said core layer being the film of claim 1 and the first and second layers comprising olefinic homopolymer or interpolymer compositions.

11. The multiply film of claim 10 wherin the core layer is from about 0.3 to about 0.4 mil in thickness, and the multiply film has an oxygen permeability from about 20 to about 70 cc.

12. The multiply film of claim 11 wherein the first layer comprises an ethylene-vinyl acetate interpolymer film including from about 5 to 20 percent by weight vinyl acetate units and is irradiated and the second outer ply is of ethylene-vinyl acetate interpolymer.

* * * * *